United States Patent
Park et al.

(10) Patent No.: US 11,495,852 B2
(45) Date of Patent: Nov. 8, 2022

(54) OUTER CASE FOR SECONDARY BATTERY, AND SECONDARY BATTERY INCLUDING SAME

(71) Applicant: Samsung SDI Co., Ltd., Yongin-si (KR)

(72) Inventors: Sunil Park, Yongin-si (KR); Donghyun Shin, Yongin-si (KR); Jungyup Yang, Yongin-si (KR); Jeongdoo Yi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 74 days.

(21) Appl. No.: 16/642,284

(22) PCT Filed: Sep. 20, 2018

(86) PCT No.: PCT/KR2018/011178
§ 371 (c)(1),
(2) Date: Feb. 26, 2020

(87) PCT Pub. No.: WO2019/083169
PCT Pub. Date: May 2, 2019

(65) Prior Publication Data
US 2021/0091346 A1 Mar. 25, 2021

(30) Foreign Application Priority Data
Oct. 24, 2017 (KR) .................. 10-2017-0138543

(51) Int. Cl.
*H01M 50/116* (2021.01)
*B32B 27/08* (2006.01)

(52) U.S. Cl.
CPC ........... *H01M 50/116* (2021.01); *B32B 27/08* (2013.01)

(58) Field of Classification Search
CPC ............................ H01M 50/116; B32B 27/08
See application file for complete search history.

(56) References Cited

U.S. PATENT DOCUMENTS

| | | | |
|---|---|---|---|
| 5,591,540 A | 1/1997 | Louie et al. | |
| 6,451,479 B1* | 9/2002 | Kim | H01M 50/116 429/163 |

(Continued)

FOREIGN PATENT DOCUMENTS

| | | |
|---|---|---|
| CN | 101207186 A | 6/2008 |
| JP | 2012-190639 A | 10/2012 |

(Continued)

OTHER PUBLICATIONS

Chinese Office Action dated Jan. 6, 2022, and Search Report dated Dec. 29, 2021, for Application No. 201880064211.8 and corresponding English Translation 7 pages.

(Continued)

*Primary Examiner* — Michael C Miggins
(74) *Attorney, Agent, or Firm* — Lewis Roca Rothgerber Christie LLP (57) ABSTRACT

Disclosed are an outer case for a secondary battery, and a secondary battery including the same, the outer case comprising: a first polymer resin layer; a second polymer resin layer positioned on a first surface of the first polymer resin layer, and having a first adhesive layer interposed therebetween so as to be attached thereto; and an inner resin layer positioned on a second surface of the first polymer resin layer, and having a second adhesive layer interposed therebetween so as to be attached thereto, wherein the first polymer resin layer and the second polymer resin layer respectively comprise a fluorine-containing resin.

9 Claims, 6 Drawing Sheets

(56) References Cited

U.S. PATENT DOCUMENTS

| | | |
|---|---|---|
| 6,455,192 B1 | 9/2002 | Chang et al. |
| 2006/0093906 A1 | 5/2006 | Yamashita et al. |
| 2008/0118830 A1 | 5/2008 | Lee et al. |
| 2011/0086230 A1 | 4/2011 | Takano et al. |
| 2012/0094131 A1 | 4/2012 | Takanashi et al. |
| 2014/0065461 A1 | 3/2014 | Kountz et al. |
| 2016/0087250 A1 | 3/2016 | Gu et al. |
| 2018/0009204 A1 | 1/2018 | Higuchi et al. |

FOREIGN PATENT DOCUMENTS

| | | |
|---|---|---|
| JP | 2013-89323 A | 5/2013 |
| JP | 2013-174010 A | 9/2013 |
| JP | 5521660 B2 | 6/2014 |
| KR | 10-2008-0044739 A | 5/2008 |
| KR | 10-2014-0134185 A | 11/2014 |
| KR | 10-1484318 B1 | 1/2015 |
| KR | 10-2015-0012853 A | 2/2015 |
| KR | 10-2015-0052028 A | 5/2015 |
| KR | 10-2015-0132037 A | 11/2015 |
| WO | WO 93/06158 A1 | 4/1993 |
| WO | WO 97/01869 A1 | 1/1997 |
| WO | WO 2011/004872 A1 | 1/2011 |
| WO | WO 2016/148071 A1 | 9/2016 |

OTHER PUBLICATIONS

Chinese Office Action dated Jul. 4, 2022, accompanying Search Report dated Jun. 28, 2022 of the corresponding Chinese Application No. 201880064211.8, and corresponding 9-page English Translation.

Jing-Bo Dong, The properties and applications of Fluoro-resins, Zhejiang Chemical Industry, 2010, vol. 41, No. 1, China Academic Journal Electronic Publishing House, China.

* cited by examiner

OUTER CASE FOR SECONDARY BATTERY, AND SECONDARY BATTERY INCLUDING SAME

CROSS-REFERENCE TO RELATED APPLICATION(S)

This application is a National Phase Patent Application of International Patent Application Number PCT/KR2018/011178, filed on Sep. 20, 2018, which claims priority of Korean Patent Application No. 10-2017-0138543, filed Oct. 24, 2017. The entire contents of both of which are incorporated herein by reference.

TECHNICAL FIELD

This disclosure relates to an outer case for a secondary battery and a secondary battery including the same.

BACKGROUND ART

A secondary battery consists of an electrode assembly including a positive electrode and a negative electrode, and a separator disposed between the positive and negative electrodes and a case housing the electrode assembly. The case for the secondary battery may have various shapes, for example, a cylinder, a quadrangle, a pouch, or the like.

In particular, the pouch-type case is appropriate for a thin cell and easily manufactured due to a simple structure and thus is mainly being used.

DISCLOSURE

Technical Problem

An embodiment of the present disclosure provides a thinner and lighter outer case for a secondary battery having improved moisture barrier properties.

Another embodiment of the present disclosure provides a secondary battery including the outer case for a secondary battery.

Technical Solution

In one aspect, the present disclosure provides an outer case for a secondary battery including a first polymer resin layer, a second polymer resin layer positioned on a first surface of the first polymer resin layer, and having a first adhesive layer interposed therebetween so as to be attached thereto and an inner resin layer positioned on a second surface of the first polymer resin layer, and having a second adhesive layer interposed therebetween so as to be attached thereto, wherein each of the first polymer resin layer and the second polymer resin layer includes a fluorine-containing resin.

In another aspect, the present disclosure provides a secondary battery including an electrode assembly and the outer case for the secondary battery of the present invention housing the electrode assembly.

Advantageous Effects

The outer case for a secondary battery according to the exemplary embodiment of the present disclosure may have improved moisture transmission resistivity and flexibility even after an excessive molding process, and may provide a lighter and thinner.

The secondary battery according to another embodiment of the present disclosure employs a thinner outer case for a secondary battery, so as to accomplish a thin secondary battery, and enhances a capacity of the secondary battery by improving a battery energy density.

MODE FOR INVENTION

Hereinafter, the present disclosure will be described more fully hereinafter with reference to the accompanying drawings, in which exemplary embodiments of the invention are shown. However, this disclosure may be embodied in many different forms and is not construed as limited to the embodiments set forth herein.

In order to clearly illustrate the present invention, parts that are not related to the description are omitted, and the same or similar elements are denoted by the same reference numerals throughout the specification.

Sizes and thicknesses of each element in the drawings are arbitrarily expressed for convenience of description and, thus, the present invention is not limited by the drawings.

In addition, unless explicitly described to the contrary, the word "comprise" and variations such as "comprises" or "comprising," will be understood to imply the inclusion of stated elements but not the exclusion of any other elements.

A conventional pouch-type case in general consists of an inner resin layer, a moisture-blocking metal layer, and an outer resin layer. However, as the moisture-blocking metal layer in the pouch-type case having the structure includes metal materials, the moisture-blocking metal layer may be damaged when excessive force is applied from outside for molding the same, so as to be easily permeated by moisture, which causes generating HF gas, and to deteriorate the performance of the secondary battery and to corrode the outer case, causing a problem of generating electrolyte leakage.

Furthermore, recently, as demands to a wearable electronic device and the like have been continuously increased, the demands to a secondary battery having an excellent flexibility is getting increased, but the conventional pouch-type case includes a moisture-blocking metal layer having a thickness that is greater than or equal to the predetermined thickness, so as to generate deformation such as wrinkling on bending and to cause a problem of deteriorating a flexibility of a secondary battery.

In order to solve the problems, inventors of the present invention have repeatedly researched, so resultantly, they finds that an outer case for a secondary battery having excellent moisture transmission resistivity and excellent flexibility even after subjecting to an excessive molding may be obtained by using a laminate of at least two polymer resin layers including a fluorine-containing resin instead of the moisture-blocking metal layer, and accomplishing the present invention.

In addition, as the outer case for a secondary battery according to the present disclosure uses a polymer resin as a material, it may make a thinner and lighter one, so that a thin secondary battery may be accomplished when applying the same to a secondary battery, and a secondary battery having enhanced capacity may be obtained.

Figure 1:
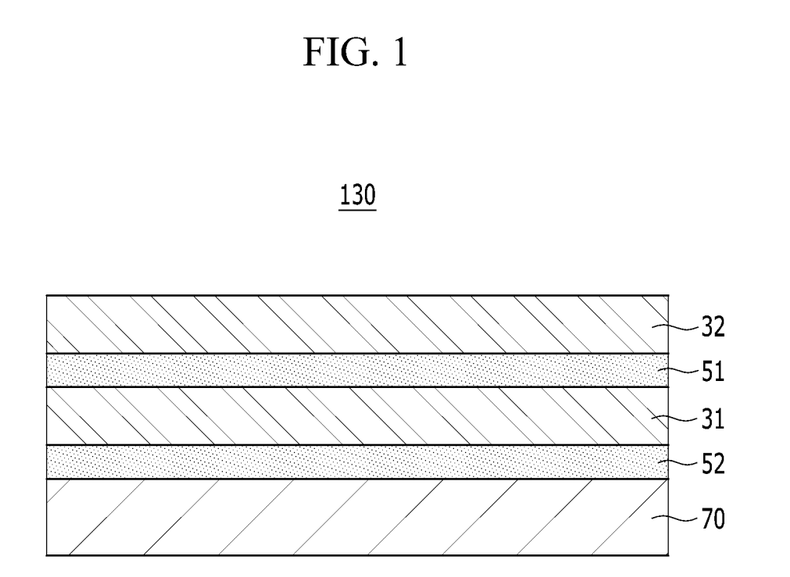
FIGS. 1 to 4 illustrate outer cases for a secondary battery according to an embodiment of the present disclosure.

FIG. 1 shows a cross-sectional surface of an outer case for a secondary battery according to an embodiment of the present disclosure.

The outer case for a secondary battery 130 according to an embodiment of the present disclosure may include a first polymer resin layer 31, a second polymer resin layer 32 disposed on a first surface of the first polymer resin layer 31 and attached by interposing a first adhesive layer 51, and an inner resin layer 70 disposed on a second surface of the first polymer resin layer 31 and attached by interposing a second adhesive layer 52.

In this case, at least one of the first polymer resin layer 31 and the second polymer resin layer 32 may include a fluorine-containing resin.

The fluorine-containing resin may include, for example, at least one selected from the group consisting of chlorotrifluoroethylene (CTFE), polychlorotrifluoroethylene (PCTFE), polytetrafluoroethylene (PTFE), polyvinylidene fluoride (PVDF), polyvinyl fluoride (PVF), perfluoro alkoxy PFA, a tetrafluoroethylene-hexafluoropropylene copolymer (FEP), an ethylene tetrafluoroethylene copolymer (ETFE), and an ethylene chlorotrifluoroethylene copolymer (ECTFE).

In this case, as the fluorine-containing resin is transparent, it also has a merit in that the electrode assembly state is easily monitored enough to determine if defect has occurred during an assemble process of applying the outer case for a secondary battery into the secondary battery.

The first polymer resin layer 31 and the second polymer resin layer 32 may be formed of the same material in this disclosure. When the first polymer resin layer 31 and the second polymer resin layer 32 are formed of the same material as described above, the uniform adhesive force may be formed between the first and second polymer resin layers 31, 32, so that it may prevent a problem that the portion having the lower adhesive force is earlier detached during forming. In addition, it is a merit of selecting an adhesive since an adhesive to only one material is considered on selecting an adhesive.

In the present disclosure, each of the first polymer resin layer 31 and the second polymer resin layer 32 may have a thickness of 10 μm to 200 μm, and more specifically, 10 μm to 50 μm, or 10 μm to 20 μm. When the thicknesses of the first polymer resin layer 31 and the second polymer resin layer 32 each satisfy the range, it may provide an outer case having the various thicknesses by controlling a thickness of the outer case even when each of the first polymer resin layer 31 and the second polymer resin layer 32 is laminated in a multi-layer to provide an outer case. In addition, it has a merit of not using an additional member for protecting an outer case including the first polymer resin layer 31 and the second polymer resin layer 32 from the outer environment.

Next, the inner resin layer 70 is to improve an insulation property and electrolyte resistance, and the like of the outer case for a secondary battery 130, for example, it may formed of polyolefin or a copolymer of polyolefin, more specifically, the polyolefin may be polyethylene (PE) or polypropylene (PP), but is not limited thereto.

The thickness of the inner resin layer 70 may be 5 μm to 100 μm, 10 μm to 50 μm, or 15 μm to 30 μm. When the thickness of the inner resin layer 70 satisfies the range, it has excellent moldability, adherence, and chemical resistance.

Figure 2:
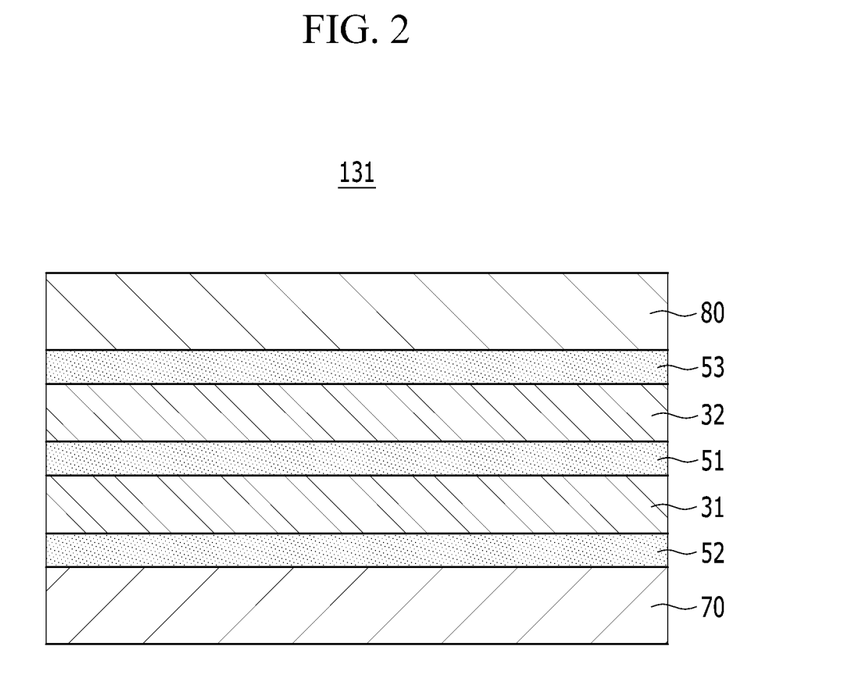

FIG. 2 shows a cross-sectional surface of an outer case for a secondary battery according to another embodiment of the present disclosure.

Referring to FIG. 2, an outer case 131 for a secondary battery according to the present embodiment may further include an outer resin layer 80 disposed on an opposite surface to the surface where the first polymer resin layer 31 is disposed, between both surfaces of the second polymer resin layer 32.

At this time, the second polymer resin layer 32 and outer resin layer 80 may be attached by disposing a third adhesive layer 53 therebetween.

The outer resin layer 80 serves to protect the outer case 131 for a secondary battery from the external environment and may be formed of at least one selected from the group consisting of for example, polyethylene terephthalate, polybutylene terephthalate, polyethylene naphthalate, polybutylene naphthalate, copolymerized polyester, polycarbonate, and a nylon film, but is not limited thereto.

In addition, a thickness of the outer resin layer 80 may be in a range of 10 μm to 100 μm or 10 μm to 50 μm. When the thickness of the outer resin layer 80 is greater than or equal to 10 μm, the film has excellent physical characteristics and thus is not easily torn apart, but when the thickness is less than or equal to 100 μm, improved moldability such as injection, forming, and the like may be obtained, and battery capacity per unit volume of the secondary battery may be improved.

In the present embodiment described referring to FIG. 2, the other elements except the third adhesive layer and the outer resin layer are same as in the outer case for a secondary battery according to an embodiment described referring to FIG. 1, so will be omitted herein.

Figure 3:
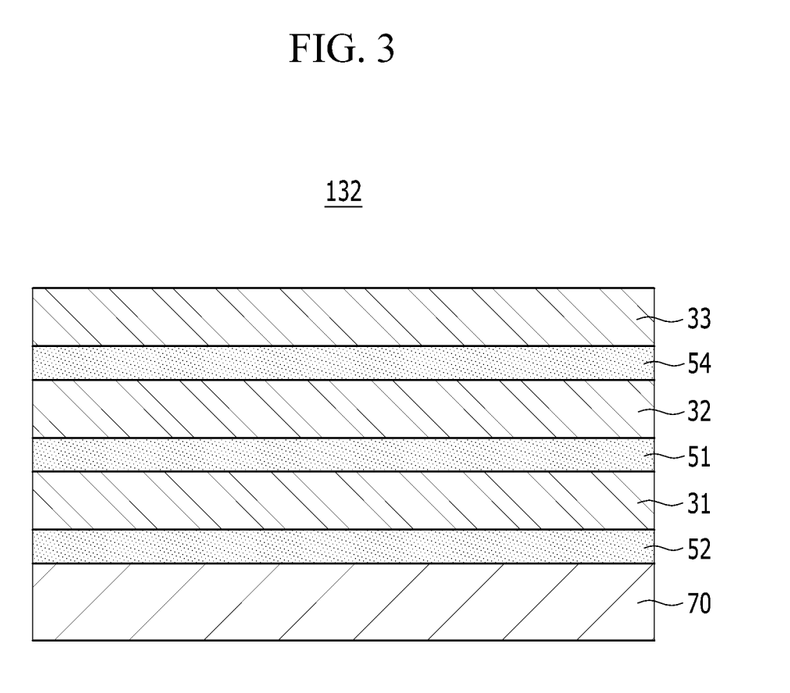

FIG. 3 shows a cross-sectional surface of an outer case for a secondary battery according to further another embodiment of the present disclosure.

Referring to FIG. 3, the outer case for a secondary battery 132 may further include at least one third polymer resin layer 33 disposed on the opposite surface to the surface where the first polymer resin layer 31 is disposed, between both surfaces of the second polymer resin layer 32.

In this case, the second polymer resin layer 32 and the third polymer resin layer 33 are attached by disposing a fourth adhesive layer 54 therebetween. At this time, when a plurality of the third polymer resin layers 33 is laminated, a plurality of fourth adhesive layers 54 may be disposed between the plurality of third polymer resin layers 33.

The third polymer resin layer 33 has the same characteristics as the first polymer resin layer 31 and the second polymer resin layer 32, so the detailed description will be omitted herein.

When further including at least one layer of the third polymer resin layer 33, it effectively improves moisture transmission resistivity characteristics before and after molding the outer case for a secondary battery according to the present embodiment.

In the present embodiment described referring to FIG. 3, the other elements except the fourth adhesive layer and the third polymer resin layer are the same as in the outer case for a secondary battery according to an embodiment described referring to FIG. 1, and thus is omitted herein.

Figure 4:
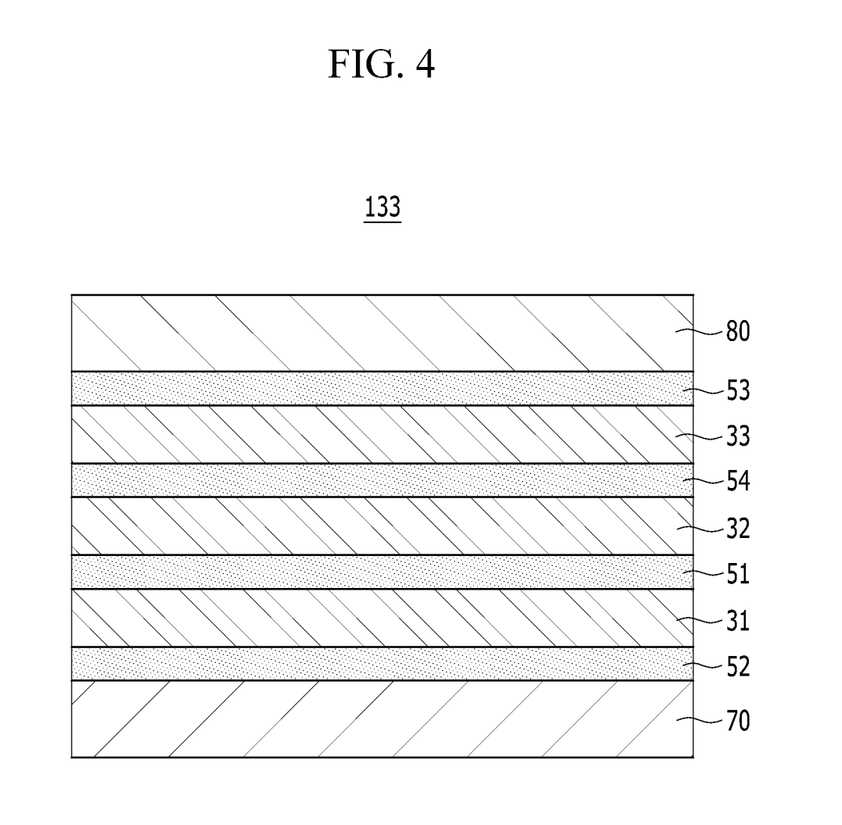

FIG. 4 shows a cross-sectional surface of an outer case for a secondary battery according to further another embodiment of the present disclosure.

Referring to FIG. 4, the outer case for a secondary battery 133 may further include an outer resin layer 80 disposed on the outermost side among surfaces of the third polymer resin layer 33, which is the surface exposed to the exterior side.

Herein, the third adhesive layer 53 may be disposed between the third polymer resin layer 33 and outer resin layer 80 to attach them each other.

Since the outer resin layer 80 is the same as that described above and thus is omitted herein.

In the present embodiment described referring to FIG. 4, the detailed descriptions for each element are the same as in the outer case for a secondary battery disclosed in the embodiments referring to FIGS. 1 to 3, and thus is omitted herein.

Meanwhile, the first adhesive layer to the fourth adhesive layers 51, 52, 53, and 54 may include any materials having adherence which are well known in the related technical fields without limitations, and may include, for example, poly urethane-based adhesive, and the like.

Furthermore, each of the first adhesive layer to the fourth adhesive layers 51, 52, 53, and 54 may have a thickness ranging from 1 µm to 10 µm. When each thickness of the adhesive layer satisfies the numeric range, it may provide a thinner outer case for a secondary battery.

As the outer cases 130, 131, 132, and 133 for a secondary battery according to the present disclosure use a laminate of at least two polymer resin layers including a fluorine-containing resin instead of the moisture-blocking metal layer as described above, it may maintain excellent moisture transmission resistivity even on the excessive molding, any may be easily applied for a flexible secondary battery since having excellent flexibility.

Next, the configuration of the secondary battery according to an embodiment of the present disclosure will be described.

Figure 5:
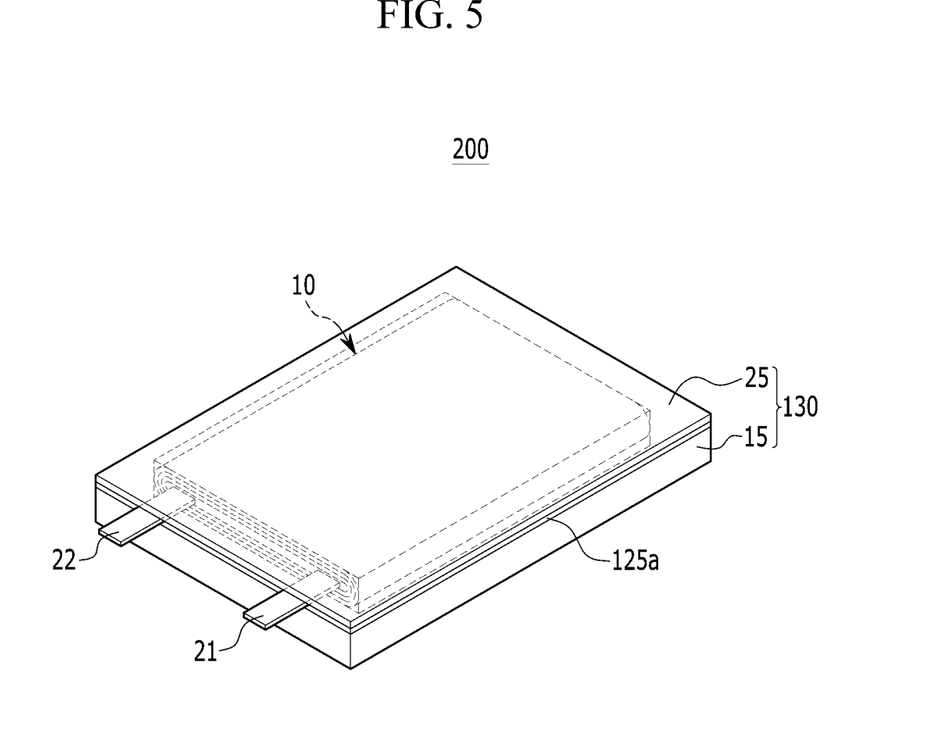
FIG. 5 is a perspective view showing a secondary battery according to an embodiment of the present disclosure.
Figure 6:
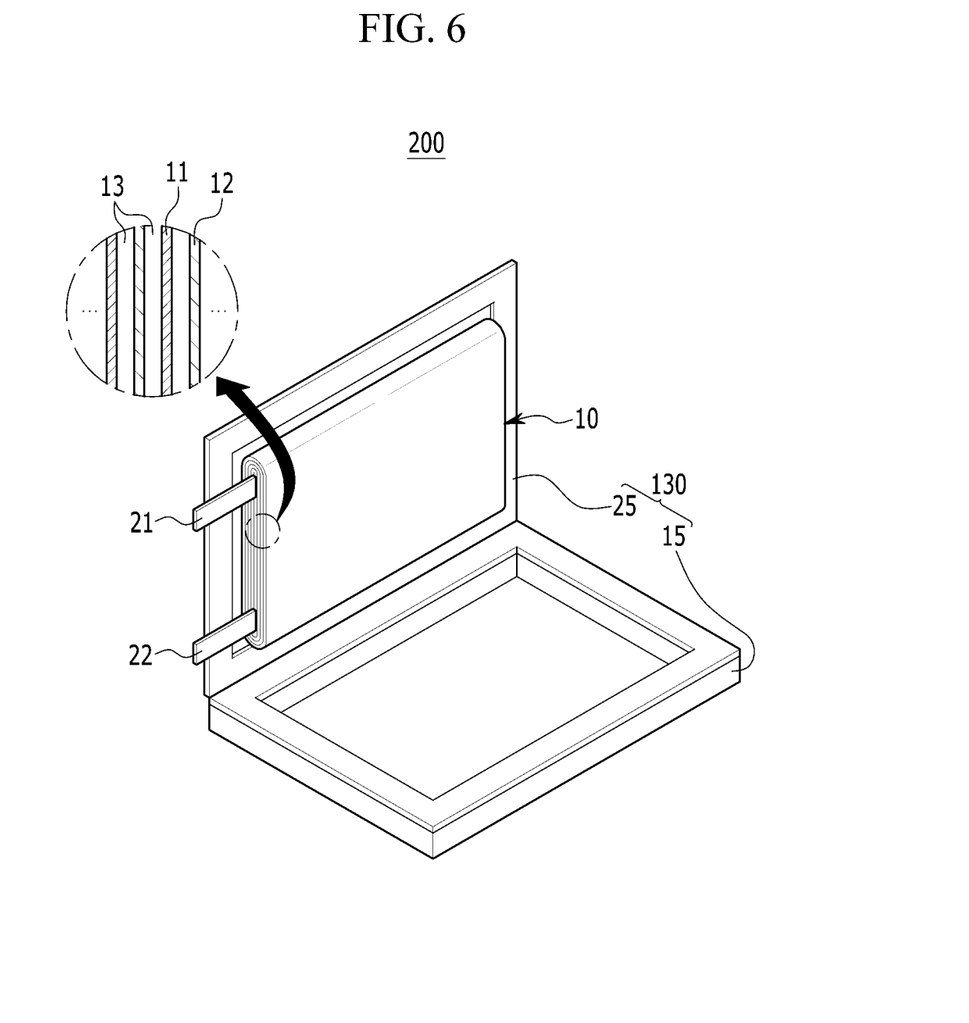
FIG. 6 is an exploded perspective view obtained by disassembling the secondary battery of FIG. 5.

FIG. 5 is a perspective view of a secondary battery according to an embodiment of the present disclosure and FIG. 6 is an exploded perspective view obtained by disassembling the secondary battery of FIG. 5.

Referring to FIGS. 5 and 6, a secondary battery 200 of an embodiment of the present disclosure includes an electrode assembly 10 and the outer case 130 housing the electrode assembly 10, and the outer case 130 may be one of the aforementioned outer cases 130, 131, 132, and 133.

First, the electrode assembly 10 performs a charge and discharge function and is manufactured to include a positive electrode 11 as a first electrode and a negative electrode 12 as second electrode and a separator 13 disposed therebetween. Herein, polarity of the first and second electrodes is not particularly limited thereto. In other words, the first electrode may be the negative electrode 12, while the second electrode may be the positive electrode 11.

On the other hand, the positive electrode 11 consists of a positive current collector formed of a metal thin plate such as aluminum and the like and a positive active material layer formed on the positive current collector, and the negative electrode 12 consists of a negative current collector formed of a metal thin plate such as copper and the like and a negative active material layer formed on the negative current collector.

In addition, the electrode assembly 10 may be formed to have a flat structure obtained by disposing the separator 13 between the band-shaped positive and negative electrodes 11 and 12 and then, spirally winding and compressing them.

However, the present invention is not limited thereto, but the electrode assembly 10 may have a structure of alternatively laminating a plurality of rectangular sheet-shaped positive and negative electrodes 11 and 12 with the separator 13 therebetween. Herein, the separator 13 is disposed between the positive and negative electrodes 11 and 12 and thus insulates the positive and negative electrodes 11 and 12 and provides a passage for moving ions.

Subsequently, a positive uncoated region and a negative uncoated region are located at one end of the electrode assembly 10, and in the positive uncoated region, a positive terminal end is adhered thereto through welding, while in the negative uncoated region, a negative terminal is adhered thereto through welding.

In a secondary battery according to an embodiment of the present invention, the electrode assembly 10 is housed in the outer case 130, and a receiving portion 15 having an opening at one side and a covering portion 25 sealing the opening may be included therein.

Herein, the receiving portion 15 may be formed to have the opening at one wide side of a hexahedron for example, in a method of injection, forming, and the like.

The aforementioned electrode assembly 10 is inserted into this opening, and the opening is sealed with the covering portion 25.

Herein, the covering portion 25 may be closed and sealed along one line of the receiving portion 15 where the opening is present by using an adhesive.

Otherwise, in the present invention, the covering portion 25 may be closed and sealed in a method of thermal welding and the like after directly adhering the resin layers 70 of the outer case forming the receiving portion 15 and the covering portion 25 without a separate adhesive.

As the secondary battery 200 according to the present disclosure employs a thinner outer case for a secondary battery, it may accomplish a thin-type secondary battery and may improve an energy density of electron to enhance a capacity of the secondary battery.

EXAMPLES FOR PERFORMING INVENTION

Hereinafter, the present invention will be described in detail with reference to the following examples.

Example 1

An inner resin layer consisted of polypropylene and having a thickness of 25 µm, a second adhesive layer and having a thickness of 2 µm, a first polymer resin layer consisted of chlorotrifluoroethylene (CTFE) and having a thickness of 15 µm, a first adhesive layer having a thickness of 2 µm, and a second polymer resin layer consisted of chlorotrifluoroethylene (CTFE) and having a thickness of 15 µm were sequentially laminated to provide a laminate.

Example 2

A laminate was obtained in accordance with the same procedure as in Example 1, except that an outer resin layer consisted of nylon having a thickness of 25 µm was further laminated on the second polymer resin layer by interposing a third adhesive layer having a thickness of 2 µm.

Example 3

A laminate was obtained in accordance with the same procedure as in Example 1, except that a third polymer resin layer consisted of chlorotrifluoroethylene (CTFE) having a thickness of 15 µm was further laminated on the second polymer resin layer by interposing a fourth adhesive layer having a thickness of 2 µm.

Example 4

A laminate was obtained in accordance with the same procedure as in Example 3, except that an outer resin layer consisted of nylon and having a thickness of 25 μm was further laminated on the third polymer resin layer by interposing a third adhesive layer having a thickness of 2 μm.

Comparative Example 1

An inner resin layer consisted of polypropylene and having a thickness of 30 μm, a metal layer consisted of aluminum and having a thickness of 25 μm, and an outer resin layer consisted of nylon and having a thickness of 16 μm were sequentially laminated to provide a laminate.

Comparative Example 2

A laminate was obtained in accordance with the same procedure as in Example 1, except that polyethylene terephthalate (PET), which is a fluorine-free resin, was used as a material for the first polymer resin layer and the second polymer resin layer.

Comparative Example 3

An inner resin layer consisted of polypropylene and having a thickness of 25 μm, an adhesive layer having a thickness of 2 μm, and a polymer resin layer consisted of chlorotrifluoroethylene (CTFE) and having a thickness of 15 μm were sequentially laminated to provide a laminate.

Comparative Example 4

A laminate was obtained in accordance with the same procedure as in Comparative Example 3, except that an outer resin layer consisted of nylon and having a thickness of 25 μm was further laminated on the polymer resin layer by interposing an adhesive having a thickness of 2 μm.

Experimental Example 1

Evaluation of Moisture Transmission Resistivity

For each of the laminates obtained from Examples 1 to 4 and Comparative Examples 1 to 4, each sample of 100 mm×100 mm was each prepared.

Subsequently, a moisture transmission resistivity was evaluated by fixing each sample onto a stand, continuously spraying a predetermined amount of moisture to one side and letting it pass the laminate, and then sensing the amount of moisture detected on the opposite side by a sensor, and then digitalizing the same.

The results were shown in Table 1.

TABLE 1

| | WVTR (g/m$^2$day) |
|---|---|
| Example 1 | 0.0005 |
| Example 2 | 0.0001 |
| Example 3 | 0.00006 |
| Example 4 | 0.00001 |
| Comparative Example 1 | 0.0001 |
| Comparative Example 2 | 0.01 |
| Comparative Example 3 | 0.01 |
| Comparative Example 4 | 0.007 |

As shown in Table 1, in the cases of the laminates obtained from Examples 1 to 4 including at least two polymer resin layers including at least fluorine-containing resin as in Examples, it is confirmed to have excellent moisture transmission resistivity. On the other hand, in the cases of the laminate according to Comparative Example 2 including no fluorine-containing resin even though including at least two polymer resin layers and the laminates according to Comparative Examples 3 and 4 including only one layer of the polymer resin layer even including at least fluorine-containing resin, the moisture transmission resistivity is greatly lower than Examples. In addition, it is understood that the laminates according to Examples had similar level or more excellent moisture transmission resistivity than the laminate according to Comparative Example 1 including a metal thin film layer instead of the polymer resin layer as in the conventional.

Experimental Example 2

Measurement of Moldability

The laminates obtained from Examples 1 to 4 and Comparative Examples 1 to 4 were molded and measured for WVTR (Water Vapor Transmission rate) in accordance with the same procedure as in Experimental Example 1, and the molding characteristics were measured by measuring the moisture transmission resistivity before and after the molding.

In this case, the molding was performed by pressing the laminate in a thickness direction using a stamp consisted of a metal having a size of 30 mm×30 mm, and then deforming the laminate to protrude the same in about 6 mm from the thickness direction.

The results were shown in Table 2.

TABLE 2

| | WVTR measurement result (g/m$^2$day) | | Variation |
|---|---|---|---|
| | Before molding | After molding | (g/m$^2$day) |
| Example 1 | 0.0005 | 0.0009 | +0.0004 |
| Example 2 | 0.0001 | 0.0002 | +0.0001 |
| Example 3 | 0.00006 | 0.00008 | +0.00002 |
| Example 4 | 0.00001 | 0.00002 | +0.00001 |
| Comparative Example 1 | 0.00001 | 0.3 | +0.2999 |
| Comparative Example 2 | 0.01 | 0.5 | +0.49 |
| Comparative Example 3 | 0.01 | 3.84 | +3.83 |
| Comparative Example 4 | 0.007 | 1.04 | +1.033 |

As shown in Table 2, it is confirmed that in the cases of the laminates obtained from Examples 1 to 4, the moisture transmission amount is rarely changed even after the molding. On the other hand, in the cases of the laminates obtained from Comparative Examples 1 to 4, it is confirmed that the outer case was damaged during the molding process to rapidly increase the moisture transmission amount after the molding.

It is confirmed that the laminates obtained from Examples 1 to 4 had more excellent moldability characteristics in greater than or equal to 100 times than the laminates according to Comparative Examples 1 to 4.

Experimental Example 3

Evaluation of Elastic Strain

Elastic strain evaluation of the laminates manufactured according to Examples 1 to 4 and Comparative Examples 1 to 4 was performed.

The evaluation was performed by a method of measuring a stress-strain curve using an UTM (Universal test machine) equipment according to ASTM D3039 and ASTM D638 methods.

The results were shown in Table 3.

TABLE 3

|  | Elastic strain (%) |
| --- | --- |
| Example 1 | 3.012 |
| Example 2 | 3.4 |
| Example 3 | 3.321 |
| Example 4 | 3.548 |
| Comparative Example 1 | 0.65 |
| Comparative Example 2 | 3.204 |
| Comparative Example 3 | 2.709 |
| Comparative Example 4 | 2.95 |

As shown in Table 3, it is confirmed that the laminates according to Examples 1 to 4 including at least two polymer resin layers including at least fluorine-containing resin as in Examples showed very excellent elastic strain. But it is understood that the laminate according to Comparative Example 1 including a metal thin film layer instead of the polymer resin layer as in conventional showed greatly decreased elastic strain compared to Examples.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

31: first polymer resin layer
32: second polymer resin layer
33: third polymer resin layer
51: first adhesive layer
52: second adhesive layer
53: third adhesive layer
54: fourth adhesive layer
70: inner resin layer
80: outer resin layer
130, 131, 132, 133: outer case for secondary battery
200: secondary battery
10: electrode assembly
21: positive terminal
22: negative terminal
15: receiving portion
25: covering portion
11: positive electrode
12: negative electrode
13: separator

The invention claimed is:

1. An outer case for a secondary battery, comprising:
a first polymer resin layer;
a second polymer resin layer positioned on a first surface of the first polymer resin layer, and having a first adhesive layer interposed therebetween so as to be attached thereto; and
an inner resin layer positioned on a second surface of the first polymer resin layer, and having a second adhesive layer interposed therebetween so as to be attached thereto;
wherein each of the first polymer resin layer and the second polymer resin layer consists of a same fluorine-containing resin, and
wherein the fluorine-containing resin comprises at least one selected from the group consisting of chlorotrifluoroethylene (CTFE), polyvinyl fluoride (PVF), perfluorinealkoxy (PFA), a tetrafluoroethylene-hexafluoropropylene copolymer (FEP), and an ethylene tetrafluoroethylene copolymer (ETFE).

2. The outer case for the secondary battery of claim 1, wherein each of the first polymer resin layer and the second polymer resin layer has a thickness of 10 μm to 200 μm.

3. The outer case for the secondary battery of claim 1, wherein each of the first adhesive layer and the second adhesive layer has a thickness of 1 μm to 10 μm.

4. The outer case for the secondary battery of claim 1, further comprising:
an outer resin layer disposed on the second polymer resin layer on a surface opposite to the surface on which the first polymer resin layer is disposed, and having a third adhesive layer interposed therebetween so as to be attached thereto.

5. The outer case for the secondary battery of claim 1, further comprising:
at least one third polymer resin layer disposed on the second polymer resin layer on a surface opposite to the surface on which the first polymer resin layer is disposed, and having a fourth adhesive layer interposed therebetween so as to be attached thereto.

6. The outer case for the secondary battery of claim 5, further comprising:
an outer resin layer disposed on the third polymer resin layer on a surface opposite to the surface on which the second polymer resin layer is disposed, and having a third adhesive layer interposed therebetween so as to be attached thereto.

7. An outer case for a secondary battery, comprising:
a first polymer resin layer;
a second polymer resin layer positioned on a first surface of the first polymer resin layer, and having a first adhesive layer interposed therebetween so as to be attached thereto; and
an inner resin layer positioned on a second surface of the first polymer resin layer, and having a second adhesive layer interposed therebetween so as to be attached thereto;
wherein each of the first polymer resin layer and the second polymer resin layer consists of a same fluorine-containing resin, and
wherein the fluorine-containing resin comprises at least one selected from the group consisting of chlorotrifluoroethylene (CTFE), polyvinyl fluoride (PVF), perfluorinealkoxy (PFA), a tetrafluoroethylene-hexafluoropropylene copolymer (FEP), and an ethylene tetrafluoroethylene copolymer (ETFE), and
wherein each of the first polymer resin layer and the second polymer resin layer has a thickness of 10 μm to 200 μm; the inner resin layer has a thickness of 5 μm to 100 μm; and each of the first adhesive layer and the second adhesive layer has a thickness of 1 μm to 10 μm.

8. The outer case for the secondary battery of claim 7, wherein a Water Vapor Transmission Rate (WVTR) of the outer case is 0.0005 $g/m^2$/day to 0.00001 $g/m_2$/day.

9. A secondary battery comprising
an electrode assembly, and the outer case for the secondary battery of claim 1 housing the electrode assembly.

\* \* \* \* \*

UNITED STATES PATENT AND TRADEMARK OFFICE
CERTIFICATE OF CORRECTION

PATENT NO. : 11,495,852 B2
APPLICATION NO. : 16/642284
DATED : November 8, 2022
INVENTOR(S) : Sunil Park et al.

It is certified that error appears in the above-identified patent and that said Letters Patent is hereby corrected as shown below:

In the Claims

Column 10, Lines 6-7, Claim 1      Delete "perfluorinealkoxy" and
                                   Insert -- perfluoroalkoxy --

Column 10, Lines 54-55, Claim 7    Delete "perfluorinealkoxy" and
                                   Insert -- perfluoroalkoxy --

Column 10, Line 65, Claim 8        Delete "g/m$_2$/day." and
                                   Insert -- g/m$^2$/day. --

Signed and Sealed this
Eighteenth Day of July, 2023

Katherine Kelly Vidal
*Director of the United States Patent and Trademark Office*